United States Patent
Lommock et al.

(10) Patent No.: US 8,091,114 B2
(45) Date of Patent: Jan. 3, 2012

(54) INTEGRATED SECURITY EVENT MANAGEMENT SYSTEM

(75) Inventors: Richard Nicholas Lommock, Cranberry Township, PA (US); Michael Cross, Monroeville, PA (US); Robert Blair Ciora, Pittsburgh, PA (US); Christopher Crawford, Winter Garden, FL (US); Mark David Kirschner, Bethel Park, PA (US); Joseph Paul Schreibeis, Eighty Four, PA (US); William Keith Engel, Allison Park, PA (US)

(73) Assignee: Bombardier Transportation GmbH, Eerlin (DE)

( * ) Notice: Subject to any disclaimer, the term of this patent is extended or adjusted under 35 U.S.C. 154(b) by 1133 days.

(21) Appl. No.: 11/847,463

(22) Filed: Aug. 30, 2007

(65) Prior Publication Data

US 2011/0184901 A1 Jul. 28, 2011

Related U.S. Application Data

(60) Provisional application No. 60/844,730, filed on Sep. 15, 2006.

(51) Int. Cl.
*G06F 21/00* (2006.01)
(52) U.S. Cl. ......... 726/1; 340/425.5; 340/945; 375/240; 375/241
(58) Field of Classification Search ....... 340/425.5–490, 340/945–983; 375/240, 241; 726/1
See application file for complete search history.

(56) References Cited

U.S. PATENT DOCUMENTS

| | | | |
|---|---|---|---|
| 5,629,862 A | 5/1997 | Brandwajn et al. | |
| 6,820,082 B1 | 11/2004 | Cook et al. | |
| 2003/0027550 A1* | 2/2003 | Rockwell | 455/410 |
| 2004/0249907 A1* | 12/2004 | Brubacher et al. | 709/220 |
| 2005/0144407 A1* | 6/2005 | Colgrove et al. | 711/162 |

OTHER PUBLICATIONS

GBDirect "Commercial Benefits of Open STandards". Aug. 30, 2004 from Internet Archive WayBack Machine. http://classic-web.archive.org/web/20040830010345/http://open-standards.gbdirect.co.uk/benefits_of_open_standards.html. 1 page.*
Hao He, "What Is Service-Oriented Architecture," Published on XML.com http://www.xml.com/pub/a/ws/2003/09/30/soa.html, Sep. 30, 2003 (6 pp.).
GE Press Release, "GE Security's Facility CommanderTM 2.0 Integrates Security Hardware and Software Across Multiple Manufacuters," Austin, Texas, Mar. 10, 2004 (2 pp.).

* cited by examiner

*Primary Examiner* — Nasser Moazzami
*Assistant Examiner* — Lisa Lewis
(74) *Attorney, Agent, or Firm* — The Web Law Firm (57) ABSTRACT

An integrated security event management system (ISEMS) is disclosed and is based on service-oriented architecture (SOA) and includes one or more computers connected to one or more service-providing devices. At least one of the computers comprises one or more modules that are adapted to perform the following tasks: tasks to dynamically discover the service-providing devices and their services within a transit security domain in about real-time; tasks to acquire asynchronous state information notifications in about real-time from the discovered services; tasks to determine one or more Boolean outcomes from the asynchronous state information in about real-time via a configurable rules engine; and tasks to evaluate the one or more Boolean outcomes in about real-time via a configurable policy engine to determine state changes of one or more security policies.

21 Claims, 5 Drawing Sheets

INTEGRATED SECURITY EVENT MANAGEMENT SYSTEM

FIELD OF THE INVENTION

The present application relates generally to the field of passenger security systems and particularly to transit security systems.

BACKGROUND OF THE INVENTION

A public transportation system is one of the most complex environments to secure as its characteristics—open access, multiple and frequent stops, and large geographic coverage areas—make it vulnerable to a variety of threats. As a result, transportation authorities face significant challenges to provide end-to-end, system-wide security for their customers, employees, and assets without impacting the smooth flow of passengers, and vehicles throughout the transit system.

The field of passenger security systems has been growing into prominence for many years now and especially so after the events of Sep. 11, 2001, in New York, the 2004 Madrid bombings, and the London attacks in 2005 that have brought into prime focus the need for providing transit security, monitoring transit passengers, to identify security-related events, and to provide notification to the authorities to enable them to take timely action.

The following are reasons why we will need an improved transit security system. Firstly, time is of the essence when it comes to identifying an event (or sometimes more than one event), providing notification of the identified event and initiating a response action based on the notification to resolve the event. Unless the above actions are performed effectively and efficiently, the provided response may be of little use. Examples of events include an opening of a door while a transit vehicle is in motion, non-opening of a door when the transit vehicle is at a terminal, detection of unattended baggage, unauthorized entry, smoke, sounding of a fire alarm, breaking of a window, fall of a person, attack of one person by another, initiation of emergency braking, uncommon sounds like the burst of a firearm or explosive, commotion within the transit vehicle, etc.

Secondly, once the event is detected, the individual security operator has to initiate a series of actions to resolve the identified event. Unfortunately, in existing systems, it becomes inefficient for the security operator to study the event further. In cases where multiple security events are identified, the security operator receives multiple notifications of the events. It becomes the duty of the security operator to study each of those notifications and respond accordingly.

Thirdly, the security systems that currently exist in the passenger rail market have been lacking in their sophistication, and have been primarily focused on providing digital recording of closed-circuit television (CCTV) cameras and providing audio telemetry. Each of these service-providing devices acts in an uncontrolled or unsynchronized manner to provide separate notifications of security events. Furthermore, they have been relatively non-intelligent systems, which are typically represented by individual encoding/recording units placed in each of the cars in a train consist and have limited to no capabilities of wireless transmission and synchronization with wayside infrastructure. Also, the current transit security systems are more static and less intelligent.

Therefore, there is a clear need for a transit security system that overcomes some or all of the inefficiencies of the existing systems.

SUMMARY OF THE INVENTION

In accordance with one embodiment of the present invention, an integrated security event management system (ISEMS) is disclosed. The ISEMS is based on service-oriented architecture (SOA) and includes one or more computers connected to one or more service-providing devices. At least one of the computers comprises one or more modules that are adapted to perform the following tasks: tasks to dynamically discover the service-providing devices and their services within a transit security domain in about real-time, wherein the service-oriented architecture (SOA) allows for a uniform means of discovery; tasks to acquire asynchronous state information notifications in about real-time from the discovered services, wherein the service-oriented architecture (SOA) allows for a uniform means of sending and receiving the notifications; tasks to determine one or more Boolean outcomes from the asynchronous state information in about real-time via a configurable rules engine, wherein the configurable rules engine is based on at least one of a Boolean, mathematical, statistical or combinational logic; and tasks to evaluate the one or more Boolean outcomes passed from the configurable rules engine in about real-time via a configurable policy engine to determine state changes of one or more security policies, wherein a security policy state change indicates a security event, and wherein the policy engine associates rules with the one or more security policy states and defines actions to be followed when a security policy state change occurs.

Examples of service-providing devices comprise at least one of onboard train control, train communication and train telemetry systems; access control systems; intrusion detection devices; audio detection devices; motion detection devices; audio content analysis devices; video content analysis devices; video recorders; audio recorders; fire alarm devices; ground-based radar systems; biological sensors; chemical sensors; firewalls; antivirus; and vulnerability management; a security event management system; an ISEMS; or combinations thereof.

In accordance with another embodiment of the present invention, a method for providing security event management using an integrated security event management system is disclosed. The method includes the steps of dynamically discovering one or more service-providing devices and their services within a transit security domain in about real-time; acquiring asynchronous state information notifications in about real-time from the discovered services; evaluating the acquired asynchronous state information notifications in about real-time to determine one or more Boolean outcomes, using at least one of a Boolean, mathematical, statistical or combinational logic; and evaluating the one or more Boolean outcomes in about real-time to determine state changes of one or more security policies and defines actions to be followed when a security policy state change occurs.

In accordance with yet another embodiment of the present invention, a computer-readable media is disclosed. The media includes code adapted to dynamically discover one or more service-providing devices and their services within a transit security domain in about real-time; to acquire asynchronous state information notifications in about real-time from the discovered services; to evaluate the acquired asynchronous state information notifications in about real-time to determine one or more Boolean outcomes using at least one of a Boolean, mathematical, statistical or combinational logic; and to evaluate the one or more Boolean outcomes in about real-time to determine state changes of one or more security policies and defines actions to be followed when a security policy state change.

In accordance with yet another embodiment of the present invention, a transit security system comprising at least a first and a second integrated security event management system (ISEMS) is disclosed. The two ISEMS are within a security domain and each ISEMS is adapted to perform one or more tasks to dynamically discover the service-providing devices and their services within a transit security domain in about real-time, wherein the service-oriented architecture (SOA) allows for a uniform means of discovery; tasks to acquire asynchronous state information notifications in about real-time from the discovered services, wherein the service-oriented architecture (SOA) allows for a uniform means of sending and receiving the notifications; tasks to determine one or more Boolean outcomes from the asynchronous state information in about real-time via a configurable rules engine, wherein the configurable rules engine is based on at least one of a Boolean, mathematical, statistical or combinational logic; and tasks to evaluate the one or more Boolean outcomes in about real-time via a configurable policy engine to determine state changes of one or more security policies, wherein a security policy state change indicates a security event, and wherein the policy engine associates rules with the one or more security policy states and defines actions to be followed when a security policy state change occurs.

In accordance with yet another embodiment of the present invention, a transit security system is disclosed. The system includes at least one integrated security event management system (ISEMS) and an onboard-to-wayside communication system. The ISEMS is adapted to perform one or more tasks to dynamically discover the service-providing devices and their services within a transit security domain in about real-time, wherein the service-oriented architecture (SOA) allows for a uniform means of discovery; tasks to acquire asynchronous state information notifications in about real-time from the discovered services, wherein the service-oriented architecture (SOA) allows for a uniform means of sending and receiving the notifications; tasks to determine one or more Boolean outcomes from the asynchronous state information in about real-time via a configurable rules engine, wherein the configurable rules engine is based on at least one of a Boolean, mathematical, statistical or combinational logic; and tasks to evaluate the one or more Boolean outcomes in about real-time via a configurable policy engine to determine state changes of one or more security policies, wherein a security policy state change indicates a security event, and wherein the policy engine associates rules with the one or more security policy states and defines actions to be followed when a security policy state change occurs.

In accordance with yet another embodiment of the present invention, a transit security system is disclosed. The system includes a transit communication system; and an integrated security event management system (ISEMS). The ISEMS is adapted to perform one or more tasks to dynamically discover the service-providing devices and their services within a transit security domain in about real-time, wherein the service-oriented architecture (SOA) allows for a uniform means of discovery; tasks to acquire asynchronous state information notifications in about real-time from the discovered services, wherein the service-oriented architecture (SOA) allows for a uniform means of sending and receiving the notifications; tasks to determine one or more Boolean outcomes from the asynchronous state information in about real-time via a configurable rules engine, wherein the configurable rules engine is based on at least one of a mathematical, a statistical or a combinational logic; and tasks to evaluate the one or more Boolean outcomes in about real-time via a configurable policy engine to determine state changes of one or more security policies, wherein a security policy state change indicates a security event, and wherein the policy engine associates rules with the one or more security policy states and defines actions to be followed when a security policy state change occurs. The ISEMS uses the transit communication system to perform at least one of the tasks described herein above.

BRIEF DESCRIPTION OF DRAWINGS

The invention may be more completely understood in consideration of the following detailed description of various embodiments of the invention in connection with the accompanying drawings, in which.

DETAILED DESCRIPTION OF DRAWINGS

Within the ISEMS, services provide the fundamental building blocks. Services may be defined as containers of data and functionality. Within the ISEMS, services are distributed throughout a network and they (services) advertise their presence. The ISEMS selects the services it wants to use based on user-defined requirements to achieve a desired functionality. This approach lends itself to dynamic systems that can be built on the fly through real-time service discovery. The service-providing devices may themselves be either intelligent systems or non-intelligent systems interfaced with intelligent devices.

Transit security systems and methods, apart from having to monitor rolling stock, need to monitor one or more of the following: stations, terminals, and inter-modal facilities; bridges and tunnels; maintenance yards and facilities; right of ways, guideways, and track works; operational control centers; administration facilities; and systems and data. In the description herein, the rolling stock is used as a primary example of implementing the present transit security systems and methods. The transit security systems and methods described herein may be applied to one or more elements of a public transportation system, many examples of which are identified above.

Rolling stock is a very good example of an environment which is not static, not centralized, and not located at fixed locations where security personnel, or technology personnel may gain accessibility when needed. Threat to the rolling stock, or even threat within the rolling Stock, may be in the form of vandalism, derailment, explosives, nuclear, biological or chemical releases on board, and/or human/animal attacks on board. One or more of these events can impact other environments within the transit system.

The ISEMS represents an onboard mobile security system designed to move intelligence onto the transit vehicle itself. Examples of transit vehicles include passenger rail systems (such as manual and automated people movers, high speed rail, monorail, subways, metros) and other forms of known passenger transportation systems (such as ground, air, water and subterranean). The ISEMS brings together state information notifications from service-providing devices, correlates this information, and may take action based on policies. Non-limiting examples of service-providing devices include remote sensors (e.g., smoke, motion, chemical, biological, or nuclear), CCTV, digital video monitors, GPS, cameras, train system data, video recorders, passenger information systems, passenger emergency equipment, audio and video analytic engines, metal detectors, access control systems, intrusion detection systems, and wayside security, comfort and safety subsystems. State information notifications contain data and metadata that characterizes the data. Characterization of the data may include name of the service-providing device (e.g., "engine monitor"), the name of the device-local service providing the data (e.g., "temperature reporting service"), name of the data being reported (e.g., "temperature"), and the native data type (e.g., "integer"). For example, data can be "75" and the metadata can be "temperature." State information notification can contain one or more data and their metadata. The ISEMS will process the state information notifications from the one or more service-providing devices in the order in which it (ISEMS) receives the notifications. The ISEMS refers to an individual piece of data and its characterizing metadata as a "signal."

The collection of service-providing devices managed by an instance of the ISEMS forms the security domain. This domain may range, for example, from a single light rail car to a complex metro light rail system consisting of many wayside passenger stations and may also include other forms of public transportation systems such as passenger buses, aircraft, ships, etc. In a different environment, a single domain may encompass one or more of the domains mentioned above such that one domain may communicate with one or few or all of the remaining domains. The ISEMS views everything in the security domain as a service provider.

Figure 1:
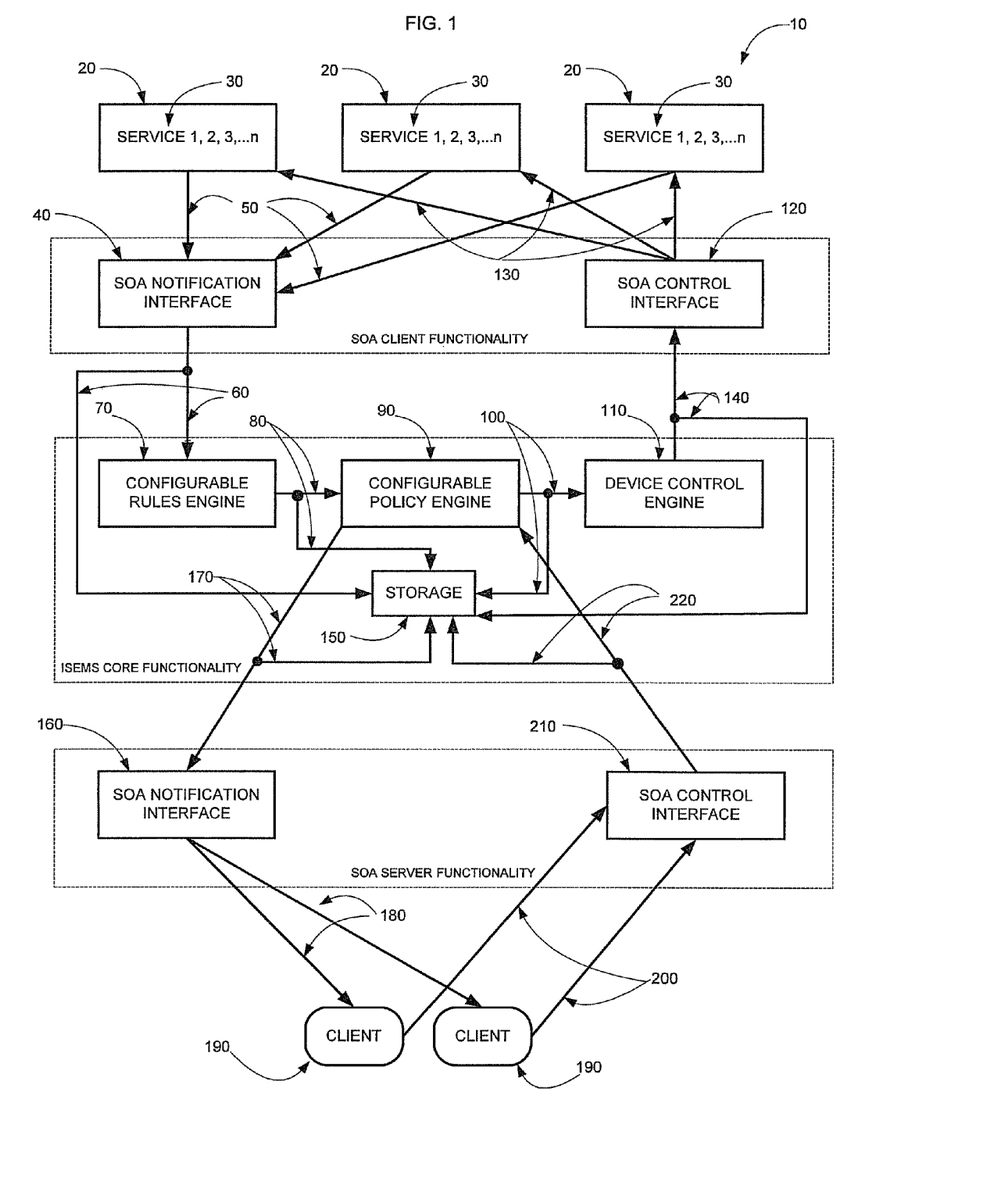
FIG. 1 is a schematic representation of how an integrated security event management system (ISEMS) views a transit domain, and how its various components interact with the transit domain.

Turning now to the figures and referring first to FIG. 1, a transit security system 10 managed by the ISEMS is illustrated. The security domain (not indicated) for the transit system 10 encompasses all the service-providing devices that are managed by an instance of the ISEMS. As explained previously, the ISEMS views all components of the transit security system as services. The ISEMS is configured to communicate with all the service-providing devices within the security domain. In certain implementations, the ISEMS may also communicate outside of the security domain, such as with wayside stations and controls, and even with a different security domain having its own transit security system and a different instance of the ISEMS. One ISEMS may function as a service-providing device to another ISEMS.

Continuing with our discussion of FIG. 1, the transit security system 10 includes one or more service-providing devices 20. Each of the service-providing devices 20 provides one or more services 30. The system 10 comprises a service-oriented architecture (SOA) notification interface 40 that receives asynchronous state information notifications 50 from the one or more services 30. The SOA notification interface 40 serializes the information notifications 50 and provides the serialized information notifications 60 to a configurable rules engine 70 (hereinafter "rules engine"). The configurable nature of the rules engine 70 allows the ISEMS to selectively determine which of the state information notifications 60 can affect the rules. In effect, all rules have inputs, but not all inputs feed rules. This means that while the state information notifications 60 may include data that represents a host of parameters, the rules engine will process only those notifications that are required by the rules. These rules can be configured to suit different requirements at different times. The rules engine 70 evaluates the state information notifications 60. In addition, inputs to the rules engine 70 may be literals. A "literal" is represented with the same metadata as a "signal," but a literal's value never changes during evaluation of a rule. The rules engine 70 is based on an event driven asynchronous process.

The rules engine 70 identifies the set of rules within the rules engine affected by any of the state information notifications 60 and applies the rules to the state information notifications to determine a Boolean outcome (TRUE or FALSE) 80 for each of the applied rules. The working of the rules engine will be explained in greater detail in the sections that follow. A rule can be viewed as a logical "IF" statement. An example logical IF statement can be: IF "temperature" is greater than "80" AND "passenger load %" is greater than "75". This results in a Boolean outcome (TRUE or FALSE) 80.

The rules engine 70 notifies the policy engine of any state change of the Boolean outcome. This means, when the Boolean outcome 80 transitions from a TRUE to a FALSE or from a FALSE to a TRUE, the policy engine is notified. The results can be time-stamped and stored in the persistent storage. The Boolean outcome 80 is determined from the data 60 using Boolean, mathematical (algorithm of some sort), statistical (based on past trends/knowledge) and/or combinational logic. Description of the rules engine and how it operates can be found in later sections.

The Boolean outcomes 80 are then evaluated by a configurable policy engine 90 (hereinafter "policy engine") to determine one or more state changes 100 of one or more security policies (not shown).

Figure 2:
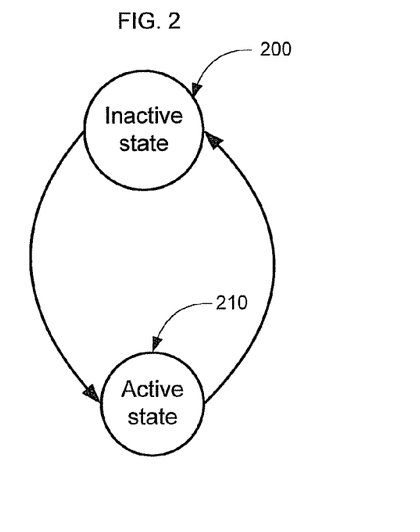
FIG. 2 is a graphical representation of rule processing.

FIG. 2 illustrates a policy as a state machine. A policy consists of two states—Active 200 and Inactive 210. For a policy to transition from an Inactive state 210 to an Active state 200, the policy engine 90 must see a Boolean outcome state change (i.e., from a TRUE to a FALSE or vice versa). Each state change has an associated policy that defines what must happen when the Boolean outcome state change is detected. The characteristics of a policy and its states, as illustrated in FIG. 2, may be described as follows: (a) a policy will always have a rule to transition to the Active state; (b) the Active state may have one or more actions that will be executed when the policy transitions to the Active state, (c) a policy may have a rule to transition to the Inactive state, (d) the Inactive state may have one or more actions that will execute when the policy transitions to the Inactive state.

For every rule that has changed state, the policy engine will identify the policy state associated with that rule. Each rule has an associated policy state. When the Boolean outcome for that rule is TRUE, and the policy is already in the associated policy state, then no transition takes place. When the Boolean outcome for that rule is TRUE, and the policy is not in the associated policy state, then a policy state transition takes place.

When a policy state transition takes place, then the policy engine executes all actions associated with that policy state. Actions may include sending signals 95 back to the rules engine 70. These signals 95 are identical to the output 60 generated by the SOA notification interface 40. Actions may also include triggering a device control engine 110 to initiate one or more commands 140 to the SOA control interface 120. The interface 120 distributes the commands 130 to the one or more services 30. It should be noted that the control requests depend on the capabilities of the device to which the control requests are being sent. The SOA notification interface 40 and the control interface 120 are responsible for providing SOA client functionality which is the ability to interface with the services 30.

Once all identified actions have been executed, the policy engine 90 determines whether any further policy state evaluation is required. This means (a) if a policy is now in the Active state, but has no rule for the Inactive state, then the policy is transitioned to the Inactive state, OR (b) if a policy is now in the Inactive state, but the Boolean outcome of the rule associated with the Active state is TRUE; then the policy is transitioned to the Active state. If a policy state change transition is forced by either (a) or (b), then all actions associated with the new policy state are executed.

Policies may be classified as security related or non-security related. The policy engine 90 emits notification 170 of policy state changes to a SOA notification interface 160 for all security related policy state changes.

The SOA interface 160 will distribute notifications 180 in about real-time to any clients 190 that have subscribed to receive such notifications 180. Furthermore, clients 190 may issue commands 191 to a SOA control interface 192 to advance one or more policy states. The SOA control interface 192 forwards these commands 193 to the configurable policy engine 90. A state change of a security policy at the request of a client 190 shall propagate through the system (via 100) as if the security policy state change had been determined internally.

A storage device 150 is present in some implementations to store information 60, 80, 100, 140, and 170 for later use, such as in a forensic analysis of the information. The storage device 150 may, in some implementations, be distributed and/or located outside the ISEMS. Such modifications are to be construed as being within the scope of the application.

The SOA notification interface 160 and SOA control interface 192 are responsible for providing SOA server functionality, which is the ability to appear as a service.

The ISEMS is built upon open standards. Examples of open standards include, but are not limited to, Universal Plug and Play (UPnP), Extensible Markup Language (XML), Simple Object Access Protocol (SOAP), Web Services Description Language (WSDL) and Transmission Control Protocol/Internet Protocol (TCP/IP). The ISEMS uses service-oriented architecture (SOA) to communicate across a network regardless of the underlying physical medium. This approach lends to a robust, distributed communications data model that enables rapid integration of data from service-providing devices in about real-time.

In order to provide situational awareness of real-time events in a security domain, the ISEMS acquires, analyzes, and may provide visualization of security related events in the security domain. The ISEMS manages a dynamic security domain that comprises elements that may not be in a predicted state of configuration. An advantage of the ISEMS is that while the elements may not be in a predicted state of configuration, the ISEMS will still be able to provide a predictable mechanism of identifying and resolving the security events.

The ISEMS is also capable of distributing key functions of the overall system amongst various computers. In one embodiment, this distribution of overall ISEMS workload will provide for the scalability required in cases where the ISEMS is handling thousands of events per day. Furthermore, given the nature of security applications, it may be required that ISEMS processing functions be capable of physical and logical redundancy. In other words, not only will the physical servers need to be redundant, but critical application services must also be redundant.

In one embodiment of the present invention, the ISEMS provides notification to all clients that have subscribed to receive the notification. These notifications may include the type of event, the severity of the event, the classification of the event (e.g., security, maintenance, etc.), and associated data from the service-providing devices within the security domain. The service-oriented architecture (SOA) defines the mechanism by which these notifications are delivered. Client devices may be workstations, security console, or another ISEMS, etc.

Figure 3:
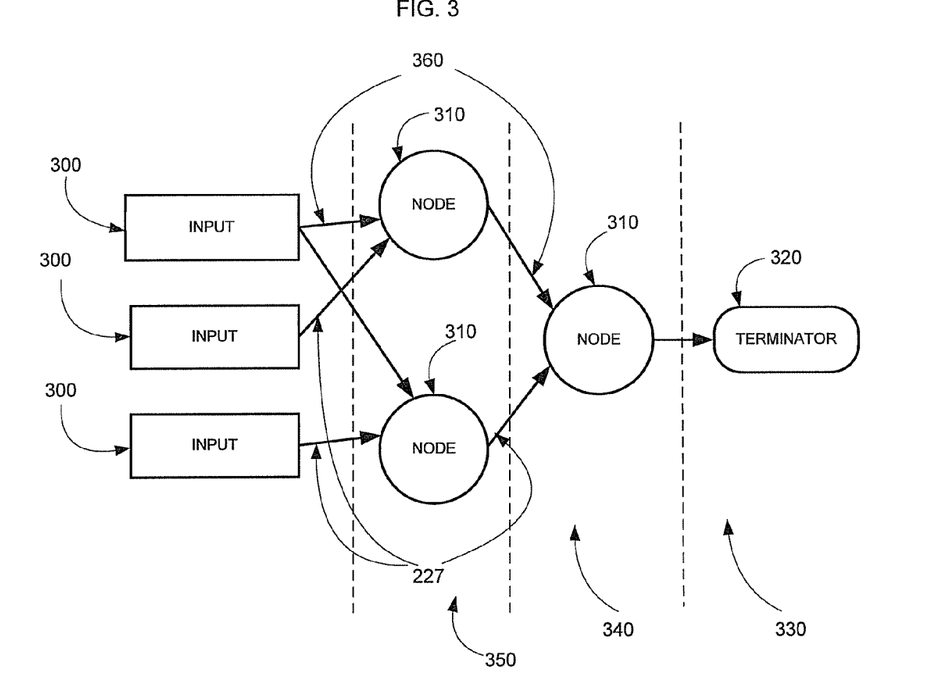
FIG. 3 is another graphical representation of rule processing.

The following section explains, with reference to FIG. 3, how the rules engine 70 works. In order to understand the rules engine, the following terminology needs to be defined. A "node" 310 represents a single unit of evaluation and generates a Boolean outcome representing that evaluation. A node can be defined uniquely by its collection of inputs 300, the evaluation performed on those inputs, and another factor referred to as the node's "depth" (discussed later). Nodes can be fed by signals and literals, or a node can be fed by the outcomes of other nodes. Nodes can feed their Boolean outcome forward into other nodes for further evaluation, or a node may feed forward into a special element called a "Terminator" 320. A node only feeds its Boolean outcome forward if the Boolean outcome changes as a result of the evaluation performed by that node. This facilitates efficient processing by "short-circuiting" a node. Simply put, if a node's Boolean outcome does not change, then that node's contribution to any forward elements will not change and thus cannot cause a change in the Boolean outcome of that forward element (although that element may be impacted by other evaluations from other nodes). Finally, a node may have a time value associated with it. This denotes the amount of time that a node's Boolean outcome must remain "TRUE" before that outcome is forwarded. A time value of zero is used to indicate that no special timing is indicated for that node.

The "Terminator" 320 represents the final Boolean outcome of a Rule. There will be only one Terminator per Rule. A Terminator has a single node as its input. A Terminator maintains a Boolean outcome that mirrors the Boolean outcome of its single input, but a Terminator performs no evaluation of its own, nor can it feed other nodes.

In summary, evaluation of a single Rule may be defined as an evaluation of one or more nodes. If the Boolean outcome of the Terminator for that Rule changes state, then the Rule itself is considered to have changed its state.

To facilitate efficient processing of multiple rules simultaneously and to conserve memory, the rules engine builds a Rule "Mesh." A Mesh combines Rule inputs (signals and literals) that are common to many Rules. A Mesh also combines identical nodes from different Rules, allowing a particular evaluation on an identical set of inputs to be performed only once regardless of how many Rules may perform that single unit of evaluation. A node in a Mesh has no knowledge of any Rules in which that node may play a part. Only a Terminator has specific knowledge of the Rule that it represents.

To build a Rule Mesh, the rules engine processes a static rule database contained in persistent storage. This database is considered "static" because it does not change as a result of activity within the ISEMS. However, this static database may be modified by users of the system, and this new configuration loaded by the rules engine. To begin building a Rule Mesh, a single Rule is loaded from the static database. The Rule is analyzed to identify its inputs (signals and literals) and the nodes that will be present in the Mesh. A Terminator 320 is built for the Rule, and links are formed leading backward from the Terminator through the nodes and finally to the inputs that feed the Rule. Note that there may be inputs that do not feed any nodes. These sorts of inputs are referred to as "cargo" data. This cargo data can be used to provide additional situational awareness to further identify security threats.

Once all links have been created, each node is assigned a depth. This is a number that represents a single node's distance from the Terminator for that rule. A Terminator will always have a depth of 0. FIG. 3 illustrates an exemplary representation of the inputs 300, nodes 310 and terminator 320 created for a single Rule. The terminator 320 is represented at the rightmost edge, and inputs on the leftmost edge. Depths 330, 340, 350 increases from right to left. Depth 330 is termed as "Depth zero," depth 340 is termed "Depth 1," and depth 350 is termed "Depth 2," and so on. Each left-to-right arrow 227 represents a feed forward.

For example, "Rule 1" may be to check for a cabin temperature within a certain band, say "80" to "100" degrees. There may be a service provider called "cabin-monitor" which exposes a service called "temperature-service" (cabin-monitor may have many services). "Temperature-service" defines a state variable called "Temperature" (temperature-service might have many state variables) that is of type "integer." A notification will be received when this Temperature changes (actually, this behavior would be defined by the service, but assume that it is defined as so).

So the Rule expression might be that "Rule 1" is "TRUE" when "signal:cabin-monitor/temperature-service/Temperature">"literal: 80" and "signal:cabin-monitor/temperature-service/Temperature"<"literal:100". Using the terms defined earlier, Inputs are signal:cabin-monitor/temperature-service/Temperature; literal:80; and literal:100. Nodes (represented by their expressions) are "signal:cabin-monitor/temperature-service/Temperature">"literal:80"; "signal:cabin-monitor/temperature-service/Temperature"<"literal:100"; "signal:cabin-monitor/temperature-service/Temperature">"literal:80", and "signal:cabin-monitor/temperature-service/Temperature"<"literal:100".

Once this tree-like structure is built for a single Rule, the structure is then incorporated into the Mesh maintained by the rules engine. If a node in the new Rule has identical inputs, evaluation, and depth as an existing node in the Mesh, then the new node is collapsed into the existing node by adding the new node's forward links to the forward links for the existing node. Note that the notion of "depth" is maintained in the Mesh as well. Once all nodes have been incorporated, a similar process is followed for the Signal and Literal inputs to a Rule. If an input is already represented in the master list of inputs for the Mesh, then the new inputs are collapsed into the old ones by adding the new inputs' forward links to the list of forward links for the existing inputs. Terminators are unique elements. The new Rule's Terminator is added to the list of Terminators for the Mesh. Finally, the list of Signal inputs for the new Rule is placed in a special, separate list unique to that Rule. This list is used later to collect the signal inputs specific to that Rule should the Rule's Boolean outcome change state as a result of an evaluation of the Mesh.

The Rules engine will invoke an evaluation of the Mesh when new signal data is received. Evaluation of a Mesh begins with an empty two-dimensional array. The first dimension represents the depth. The second dimension represents potential nodes that may require evaluation at a particular depth.

Evaluation of a Mesh begins with an empty two-dimensional array. The first dimension represents the depth. The second dimension represents potential elements that may require evaluation at a particular depth. In this discussion, an element may refer to either a node or a Terminator.

For each changed signal in the state information notification, each node that is fed by that signal input is placed into the two-dimensional array according to the depths of those nodes. Once this initial population of the array is complete, a Mesh analysis commences.

The two-dimensional array is analyzed from highest depth value to lowest—elements that are "deeper" in the Mesh are always analyzed first. The rules engine locates the deepest depth slot with nodes present, and initiates an evaluation on each node at that depth. If a node's Boolean outcome does not change state, then no further action is taken. If a node's Boolean outcome changes state as a result of its evaluation, then each forward element fed by that node is inserted into the two-dimensional array according to depths of those nodes. These elements may be either nodes or Terminators. Note that these forward elements will always have a lower depth value than the node just evaluated.

Once all elements at a particular depth have been analyzed, the rules engine locates the next lower depth "slot" in the two-dimensional array that contains elements to be analyzed. If such a slot is found, then each element at that depth is analyzed as explained above. If no more elements can be found, then the analysis is complete.

If at any point during this analysis, a Terminator is seen, then the Rule represented by that Terminator is considered to have changed state. This Terminator is placed into a separate list along with any other Terminators located during the complete analysis of the two-dimensional array. Note that since Terminators cannot feed other elements, no further processing is invoked at this time for a Terminator, although analysis of the remainder of the two-dimensional array continues.

Once the two-dimensional array has been exhausted, the separate list of Terminators is checked. If no Terminators were discovered, then no further processing occurs. For each Terminator discovered, a notification is created. This notification contains information defining the Rule that has changed state, the new state of the Rule, the former state of the Rule, a time stamp, and the list of the latest signal data associated with that Rule. This includes "cargo" signals. The set of signals local to that Rule was created when the Rule was incorporated into the Mesh and the latest value of each of these Signals is maintained implicitly by the rules engine.

Once this list of notifications defining the Rules that have changed state has been built, this list is forwarded to the policy engine 90.

Figure 4:
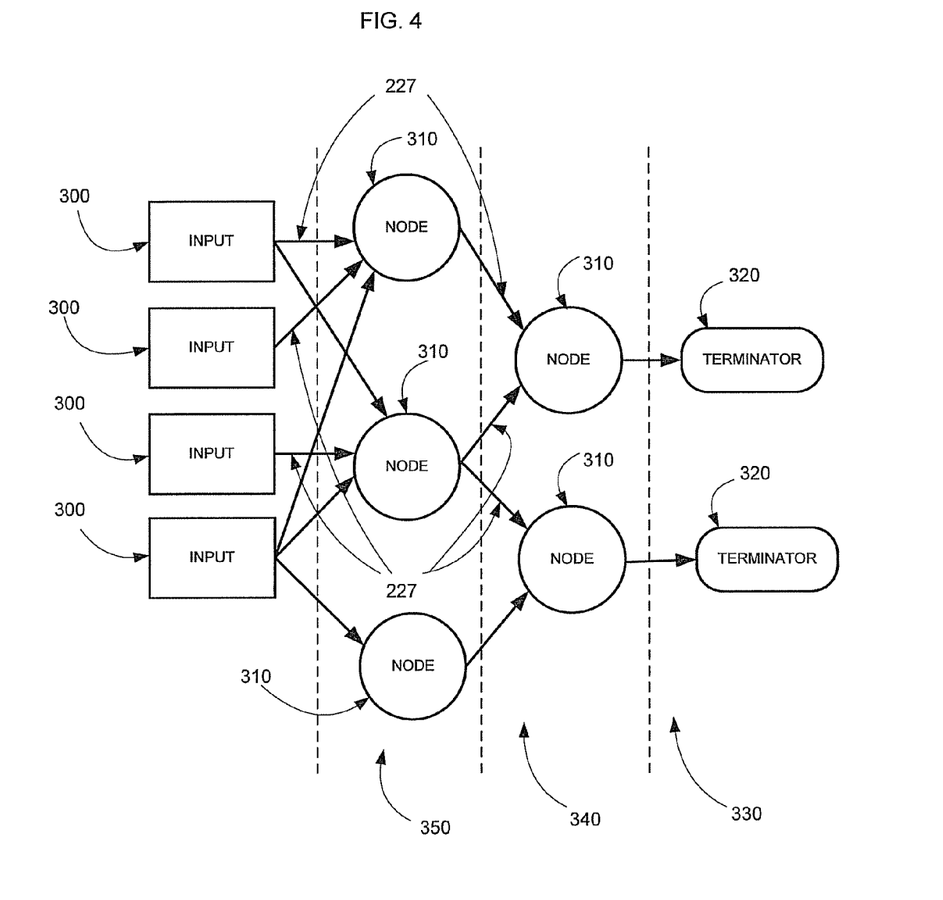
FIG. 4 is representation of a policy engine state machine.

FIG. 4 illustrates an exemplary rule processing for two rules. As will be noticed, there are two terminators 320 as compared to the one terminator in FIG. 3. Further, FIG. 4 also illustrates how inputs and nodes may be shared between two rules. This is advantageous because it reduces memory usage, and enables faster computations.

Figure 5:
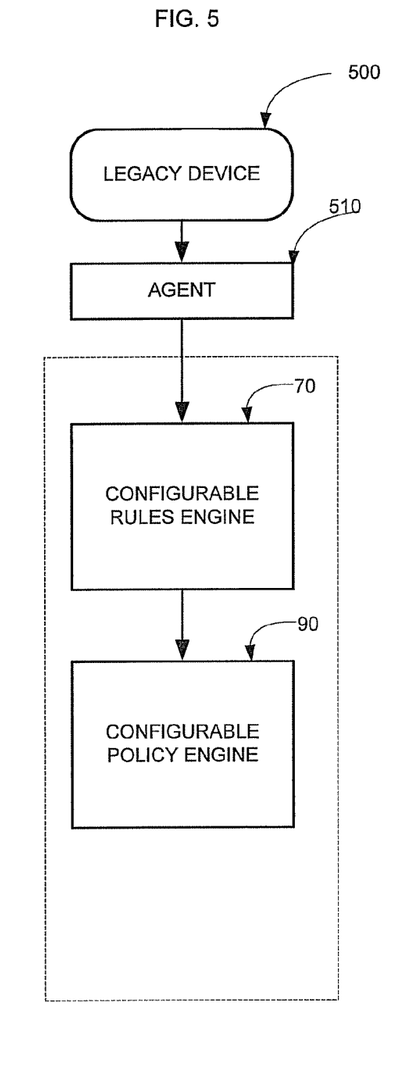
FIG. 5 is a block diagram showing the interaction of a portion of an ISEMS when a non-conformant device is connected to it.

In an implementation (as shown in FIG. 5) where the ISEMS must receive state information notifications from a device 500 that is not service oriented, the ISEMS will define an agent 510 that functions as a gateway to translate information from and send commands to the non-conformant device 500. Such a feature is advantageous in situations where the proposed transit security system needs to be retrofitted onto existing transit systems that have legacy devices. Legacy devices in this present application are defined as devices that are unable to communicate or work on a service-oriented architecture (SOA) environment. It must be recalled that the ISEMS uses the service-oriented architecture (SOA) to communicate with the various service-providing devices.

In one implementation, the ISEMS may include one or more digital computers that are programmed to perform one or more tasks. In the discussion herein below, it may be construed that the tasks may be performed in full or in part by one or more computers. The computer (or computers) may be connected to the one or more service-providing devices either directly or indirectly.

The ISEMS dynamically discovers all the service-providing devices that are connected to the ISEMS domain. The ISEMS may further discover in about real-time when a service-providing device is either newly connected into the security domain or is removed from the security domain. By dynamically discovering all the service-providing devices, the ISEMS also identifies all the services that are provided by each of the service-providing devices. It is possible for one device to be capable of performing more than one service. This act of dynamic discovery occurs in about real-time. The ISEMS' ability to dynamically discover the service-providing devices and their services is facilitated by the service-oriented architecture (SOA). The ISEMS relies upon the service-oriented architecture (SOA) to send commands to, and receive asynchronous state information notifications from the service-providing devices.

The ISEMS then determines one or more Boolean outcomes from the asynchronous state information notifications using one or more of a mathematical, statistical or a combinational logic. Determination of state changes of one or more security policies occurs by evaluating the one or more Boolean outcomes via a policy engine. The policy engine associates rules with one or more security policy states and further defines actions to be followed when a security policy state change occurs.

The ISEMS may also emit notifications of the one or more security events within the security domain when the determination of security policy state change indicates the presence of one or more security events. These notifications may be sent using SOA to all the subscribed clients and specific commands may be issued to the one or more services to, for example, correct or mitigate the detected security event. The ISEMS relies upon SOA functionality to issue the commands. In certain other implementations, when no security event is detected/determined, the transit security system may not emit any notification at all.

Consider an example of a command is to turn all lights in a certain vehicle to an ON state. The command would be received by all devices that have a lighting service in that particular vehicle. Devices that have a lighting service may include, but not limited to, cabin lights, billboard lights, personal reading lamps, emergency lamps, etc. All light devices that are in an OFF state would be required to switch to an ON state. However, all light devices that are already in an ON state would continue to remain in that state.

When a train network is available, the ISEMS will be capable of utilizing the existing train network and other onboard and train-to-wayside communications infrastructure to manage the security domain. For example, the ISEMS may use the existing train network to collect train information and to issue commands to onboard services. Commands may include directing the transit vehicle to stop at the next station or passenger terminal (when there was no previous intention to stop) or to skip the next station or passenger terminal (when there was a previous intention to stop). Other commands may include altering the field of view of a recording camera (video device) or initiating the recording of audio from a particular part of the transit vehicle, or providing a voice announcement. In certain instances, the ISEMS may also provide a notification to emergency personnel outside the transit vehicle so that the emergency condition may be mitigated or resolved. A wireless network may also be used by the ISEMS to communicate with the service-providing devices distributed within the security domain.

Figure 6:
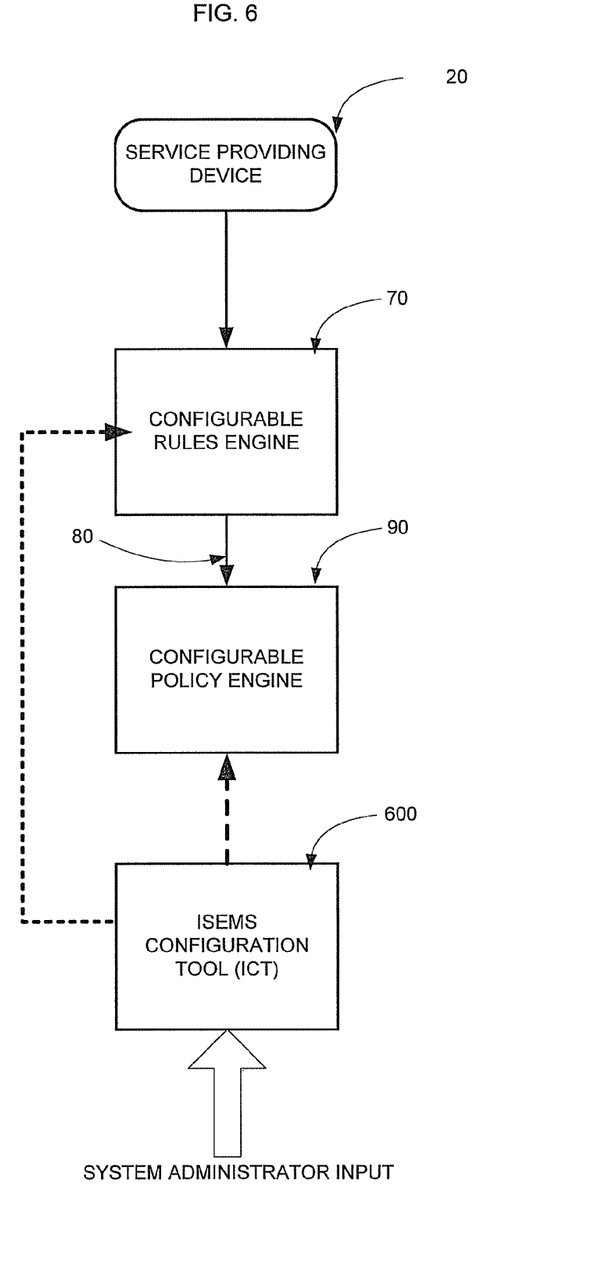
FIG. 6 is a block diagram illustrating an ISEMS configuration tool.

In a different embodiment, such as illustrated by FIG. 6, an ISEMS configuration tool (ICT) 600 may be used to dynamically configure or reconfigure at a later point of operation, the rules engine 70 and the policy engine 90. The ISEMS-configured tool (ICT) 600 is a graphical user interface that allows a system administrator (or anyone skilled or trained) to quickly and easily configure the rules engine 70 and the policy engine 90. The ICT 600 may be configured for both dynamic and static operation.

In one embodiment, a light rail train may be an ISEMS security domain. A separate ISEMS domain may encompass many such trains. This enables the one or more onboard ISEMS domains to work autonomously, managing their specific domains. In the ISEMS, the same protocols with which the various service-providing devices connect to and communicate data is the same protocol for which one ISEMS domain communicates with other ISEMS domains and services. In this design, everything is a service and everything can self-organize and communicate.

In another implementation, the ISEMS may communicate with audio analysis services that provide evaluation capability to identify, for example, suspicious behavior, threat scenarios, and many other potential anomalies. Using the service-oriented architecture (SOA), these services notify the ISEMS when such anomalies are detected.

In another implementation, the ISEMS may communicate with video analysis services that provide evaluation capability to identify, for example, passenger counting, unattended objects, camera obstruction, crowd density, face recognition, suspicious behavior, threat scenarios, and potential anomalies. Using the service-oriented architecture (SOA), these services notify the ISEMS when such anomalies are detected.

Figure 7:
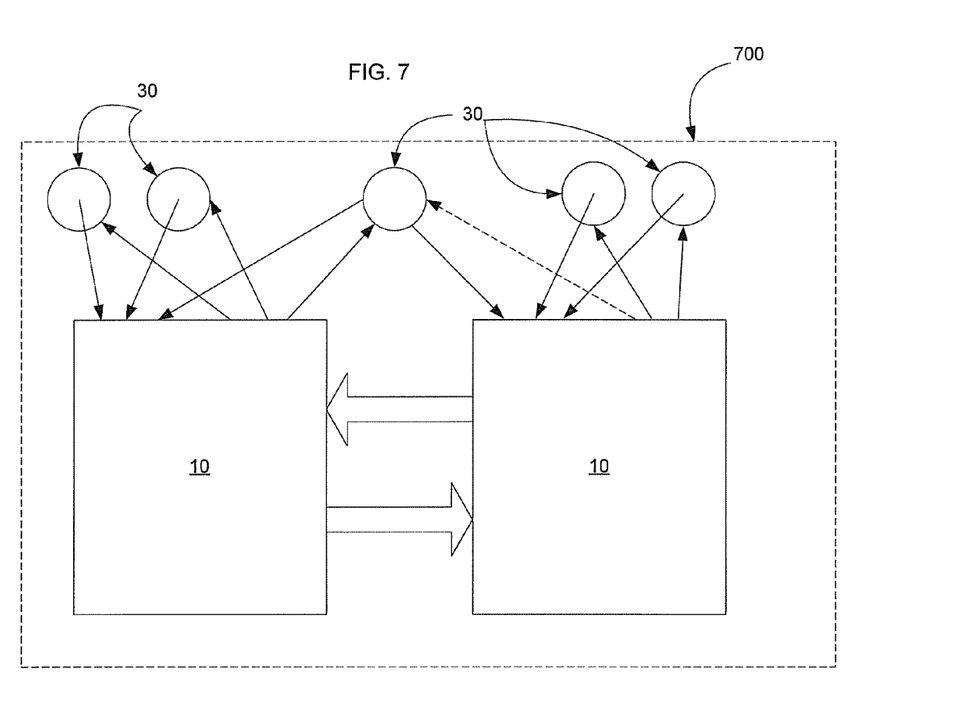
FIG. 7 is a block diagram illustrating an exemplary communication between two ISEMS.

In a different embodiment, a transit security domain 700, as illustrated in FIG. 7, may encompass two different ISEMS, each functioning in a manner as described previously and additionally also being able to communicate with each other in exchanging security event information or for aiding in providing dynamic redundancy or both. Such a built-in redundancy may also require the use of an arbitration service to determine which ISEMS maintains control over the security domain. In a different aspect of the embodiment, both ISEMSs 10 may be obtaining common state information from one or more service-providing devices 30. In accordance with yet another different aspect of the present embodiment, more than two ISEMS may function/interact in a similar manner.

Based on configuration, the ISEMS may adjust the response of the transit security system in such a way as to provide situational awareness, optimize surveillance, issue alarms and perform other functions depending on the nature of a detected event. Examples of functions include sending passenger alarm information; triggering passenger information announcements; contacting fire, police, or train recovery personnel; rerouting trains either noticeably or covertly; reconfiguring sensor data pathways; adjusting audio sampling rate; adjusting video resolution; or disabling one or more malfunctioning sensor devices.

The following sections describe operation of the ISEMS in an exemplary situation. In order to aid in better understanding, the arrangement of FIG. 1 may be used. Actual devices that correspond to each of the components of FIG. 1 have been assigned similar reference numbers. Consider a case where a commuter rail operator has experienced an increased incidence of unauthorized personnel entering out of service cars in their maintenance yards. The operator would like to enforce a policy that notifies security personnel of any entries into cars in the maintenance facility. In this scenario, the operator would like any instance of unauthorized entry into a vehicle that is out of service to be reported to security personnel. As part of the security system response, the operator would require lights to be turned on inside the vehicle and vehicle doors locked. However, since the vehicles are in a maintenance yard, the operator does not want notification of routine authorized activity in the cars.

There are many states that must be taken into account for the transit security system to effectively enforce this policy. In this example, the important states are the location of the train, the mode of the train (in service, out of service, or maintenance), and whether or not motion is detected within the train.

In this example, the system reads these states from interfaced onboard train systems and monitors these states for change. The system reads and monitors states from service devices 20 that provide services 30, such as train telemetry and control, motion detection, and lighting control.

If a service device 20 having a motion detection service 30 detects motion, it sends asynchronous state information 50 to the SOA notification interface 40. Other asynchronous state information 50, such as train telemetry data indicating the state of the door (open or closed), mode information, and location of the train, are sent to the SOA notification interface 40 via a train telemetry service 30. The interface 40 serializes the state information 50 and sends the serialized state information 60 to the rules engine 70.

The rules engine 70 applies the state information 60 to a previously configured Rule to determine a logical state 80. The logical state 80 will be "TRUE" if (a) there is motion within the train, (b) the train is an "out of service" mode, and (c) the train is located in a maintenance yard. This logical state 80 is now sent to the policy engine 90.

The policy engine 90 checks the state of the previously configured policy. If the policy is already "Active," then the logical state 80 is ignored. However, if the policy is not "Active", then the policy engine 90 moves the policy to the "Active" state and issues state change notifications 100, 170.

The device control engine 110 issues commands 140 to the SOA control interface 120. The SOA control interface 120 determines whether a target service exists. If so, the SOA control interface 120 forwards the commands 130 to those specific services 30. In this case, a command to turn on all lights would be sent to the lighting service and a command to lock all doors would be sent to the door lock service.

The SOA notification interface 160 issues policy state change notifications 180 to any subscribed clients 190 to indicate that the policy is in an "active" state. In this example, the clients 190 would be the operator's security workstations.

Once the operator has determined that there is no longer a security threat, the security workstation 190 can issue a command 191 to the SOA control interface 192 to clear the security policy. The SOA control interface 192 forwards this command 193 to the configurable policy engine 90. If the policy is in an "Active" state, the policy engine 90 will clear the policy, i.e., making the policy "not Active" and issue state change notifications 100, 170. Alternately, a rule may be configured to change a policy state to "not Active."

The device control engine 110 issues commands 140 to the SOA control interface 120. The SOA control interface 120 determines whether a target service exists. If so, the SOA control interface 120 forwards the commands 130 to those specific services 30. In this case, a command to turn off all lights would be sent to the lighting service and a command to unlock all doors would be sent to the door lock service.

The SOA notification interface 160 issues policy state change notifications 180 to any subscribed clients 190 to indicate that the policy is no longer "Active." In this example, the clients 190 would be operator's security workstations.

In another example, consider a scenario where two or more cameras are monitoring the inside of a vehicle, and an ISEMS policy indicates a security event. The ISEMS may command the recording of the same event by more than one camera to enable viewing of the event from multiple angles. When the image from a camera is unavailable, the ISEMS may control the recording of the event using the other camera.

Figure 8:
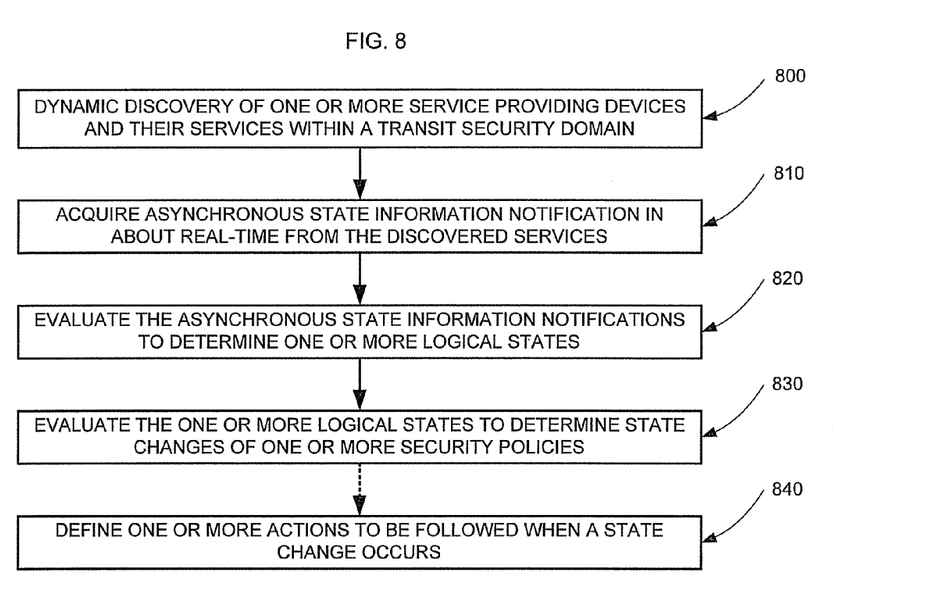
FIG. 8 is a flowchart illustrating an exemplary method of operation of an ISEMS.

In accordance with one aspect of the present embodiment, an exemplary method of operation of the ISEMS (as illustrated in FIG. 8) may include the steps of dynamically discovering one or more service-providing devices and their services within a security domain 800. Once the services have been discovered, the method involves acquiring asynchronous state information in about real-time from the discovered services 810. The next step 820 is to evaluate the asynchronous state information to determine one or more Boolean outcomes. The Boolean outcomes are then evaluated at step 830 to determine state changes of one or more security policies. As explained previously, the state change in a security policy may indicate a security event. When a state change is determined, the system may define and/or initiate (at step 840) one or more actions to be followed to mitigate or resolve the security event. The various implementations and their advantages of these various steps have been described in earlier sections. It should be noted that such implementations may include a combination of more than one implementation (in no particular sequence) in order to gain the multitude of advantages that each one implementation will offer.

In accordance with yet another aspect of the present embodiments, the above examples, demonstrations, and method steps may be implemented by suitable code on a processor-based system, such as general purpose or special purpose computer. It should also be noted that different implementations of the invention may perform some or all the steps described herein in different orders or substantially concurrently, that is, in parallel. Furthermore, the functions may be implemented in a variety of programming languages. Such code, as will be appreciated by those of ordinary skill in the art, may be stored or adapted for storage in one or more tangible machine readable media, such as on memory chips, local or remote hard disks, optical disks or other media, which may be accessed by a processor based system to execute the stored code. In another example, the software may be embedded into the one or more hardware units to form embedded systems. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

Having thus described our invention with the detail and particularity required by the Patent Laws, what is desired protected by Letters Patent is set forth in the following claims.

What is claimed is:

1. An integrated security event management system (ISEMS), based on service-oriented architecture, comprising one or more computers connected to a combination of different types of service-providing devices that advertise services and transmit state information notifications, the one or more computers comprising one or more program modules adapted to perform:
- a) tasks which issue commands to the service-providing devices and allow the service-providing devices to define and advertise their one or more services
- b) tasks which dynamically discover the service-providing devices and their services within a transit security domain in real-time, wherein the service-oriented architecture allows for a uniform means of discovery;
- c) tasks which acquire asynchronous state information notifications in real-time from the discovered services, wherein the service-oriented architecture allows for a uniform means of sending and receiving the notifications;
- d) tasks which determine one or more Boolean outcomes from the asynchronous state information in real-time via a configurable rules engine, wherein the configurable rules engine is based on at least one of a Boolean, mathematical, statistical or combinational logic; and
- e) tasks which evaluate the one or more Boolean outcomes in about-real-time via a configurable policy engine to determine state changes of one or more security policies, wherein a security policy state change indicates a security event, and wherein the policy engine associates rules with the one or more security policy states and defines actions to be followed when a security policy state change occurs.

2. The system of claim 1, further comprising tasks which emit notification of the one or more security events within a transit security domain in real-time when evaluation of the one or more Boolean outcomes determines the presence of one or more security events, wherein the service-oriented architecture defines a means for providing the notification.

3. The system of claim 1, wherein the service-providing devices communicate with the one or more computers via a transit communication network.

4. The system of claim 1, further comprising a configuration tool that identifies the discovered devices, their advertised services and states for use in configuring the system.

5. The system of claim 1, further comprising an agent to translate data from an ISEMS incompatible device to an ISEMS recognizable service representation.

6. The system of claim 1, wherein the service-oriented architecture is based on open standards.

7. The system of claim 1, further comprising a backup digital computer in communication with the one or more computers, the backup digital computer configured to switch roles with said one or more computers in an event of a failure of said one or more computers.

8. The system of claim 1, wherein the service-providing devices comprise at least one of onboard train control, train communication and train telemetry systems; access control systems; intrusion detection devices; audio detection devices; motion detection devices; audio content analysis devices; video content analysis devices; video recorders; audio recorders; fire alarm devices; ground-based radar systems; biological sensors; chemical sensors; firewalls; antivirus; and vulnerability management; a security event management system; an ISEMS; or combinations thereof.

9. A method for providing security event management using a mobile integrated security event management system comprising the steps of:
- a) issuing commands to a combination of different types of service-providing devices and allowing the service-providing devices to define and advertise their one or more services;
- b) dynamically discovering a combination of different service-providing devices and their services within a transit security domain in real-time;
- c) acquiring asynchronous state information notifications in real-time from the discovered services;
- d) evaluating the acquired asynchronous state information notifications in real-time to determine one or more Boolean outcomes, using at least one of a Boolean, mathematical, statistical or combinational logic; and
- e) evaluating the one or more Boolean outcomes in real-time to determine state changes of one or more security policies and defining actions to be followed when a security policy state change occurs.

10. The method of claim 9, further comprising emitting notification of the one or more security events in real-time when evaluation of the one or more Boolean outcomes determines the presence of one or more security events.

11. The method of claim 10, comprising sending the services, the asynchronous state information, the one or more Boolean outcomes, the security policies, the actions and the notifications to a database.

12. The method of claim 9, comprising configuring the system based on the discovered devices, their advertised services and states.

13. The method of claim 9, comprising translating data from an ISEMS incompatible device to an ISEMS recognizable service representation.

14. A non-transitory computer-readable media, comprising code adapted to:
- a) issue commands to a combination of different types of service-providing devices and allow the service-providing devices to define and advertise their one or more services;
- b) dynamically discover a combination of different service-providing devices and their services within a transit security domain in real-time;
- c) acquire asynchronous state information notifications in real-time from the discovered services;
- d) evaluate the acquired asynchronous state information notifications in real-time to determine one or more Boolean outcomes using at least one of a mathematical, a statistical or a combinational logic; and
- e) evaluate the one or more Boolean outcomes in real-time to determine changes in state of one or more security policies and defines actions to be followed when a security policy state change.

15. The non-transitory computer-readable media of claim 14, further comprising code adapted to provide notifications of the one or more security events in real-time when evaluation of the one or more Boolean outcomes determines the presence of one or more security events.

16. A transit security system, comprising:
- a combination of different types of service-providing devices, each service-providing device capable of performing one or more services; and
- at least one integrated security event management system comprising a computer programmed which performs:
  - a) tasks which issue commands to the service-providing devices and allow the service-providing devices to define and advertise their one or more services;
  - b) tasks which dynamically discover the service-providing devices and their services within a transit security domain in real-time, wherein the service-oriented architecture allows for a uniform means of discovery;

c) tasks which acquire asynchronous state information notifications in real-time from the discovered services, wherein the service-oriented architecture allows for a uniform means of sending and receiving the notifications;

d) tasks which determine one or more Boolean outcomes from the asynchronous state information in real-time via a configurable rules engine, wherein the configurable rules engine is based on at least one of a Boolean, mathematical, statistical or combinational logic; and e) tasks which evaluate the one or more Boolean outcomes in real-time via a configurable policy engine to determine state changes of one or more security policies, wherein a security policy state change indicates a security event, and wherein the policy engine associates rules with the one or more security policy states and defines actions to be followed when a security policy state change occurs; and an onboard-to-wayside communication system.

17. The transit system of claim 16, wherein the onboard-to-wayside communication system comprises a wireless communication network.

18. The transit system of claim 16, wherein a second ISEMS is a service-providing device for the at least one ISEMS, the second ISEMS communicating with the at least one ISEMS via the onboard-to-wayside communication system.

19. A transit security system, comprising:
a transit communication system;
a combination of different types of service-providing devices, each service-providing device capable of performing one or more services; and
an integrated security event management system (ISEMS) which performs:

a) tasks which issue commands to the service-providing devices and allow the service-providing devices to define and advertise their one or more services;

b) tasks which dynamically discover the service-providing devices and their services within a transit security domain in real-time, wherein the service-oriented architecture allows for a uniform means of discovery;

c) tasks which acquire asynchronous state information notifications in real-time from the discovered services, wherein the service-oriented architecture allows for a uniform means of sending and receiving the notifications;

d) tasks which determine one or more Boolean outcomes from the asynchronous state information in real-time via a configurable rules engine, wherein the configurable rules engine is based on at least one of a mathematical, a statistical or a combinational logic; and e) tasks which evaluate the one or more Boolean outcomes in real-time via a configurable policy engine to determine state changes of one or more security policies, wherein a security policy state change indicates a security event, and wherein the policy engine associates rules with the one or more security policy states and defines actions to be followed when a security policy state change occurs, wherein the mobile integrated security event management system uses the transit communication system to perform at least one of the tasks.

20. The transit security system of claim 19, wherein the transit communication system facilitates communication between the ISEMS and the one or more service-providing devices.

21. The transit security system of claim 19, wherein the transit communication system facilitates communication between the ISEMS and an external device, wherein the external device is located outside a security domain within which the ISEMS operates.

* * * * *

UNITED STATES PATENT AND TRADEMARK OFFICE
CERTIFICATE OF CORRECTION

| | |
|---|---|
| PATENT NO. | : 8,091,114 B2 |
| APPLICATION NO. | : 11/847463 |
| DATED | : January 3, 2012 |
| INVENTOR(S) | : Richard N. Lommock et al. |

It is certified that error appears in the above-identified patent and that said Letters Patent is hereby corrected as shown below:

Title Page, Column 1, Item (73) Assignee, Line 2, delete "Eerlin" and insert -- Berlin --

Title Page, Column 2, Item (74), Line 1, delete "Web" and insert -- Webb --

Column 15, Line 24, Claim 1, delete "about-real-time" and insert -- real time --

Signed and Sealed this
Twenty-seventh Day of March, 2012

David J. Kappos
*Director of the United States Patent and Trademark Office*